(12) United States Patent
Ueno

(10) Patent No.: US 7,137,801 B2
(45) Date of Patent: Nov. 21, 2006

(54) THREE-DIMENSIONAL STEREOLITHOGRAPHIC APPARATUS

(75) Inventor: Takakuni Ueno, Tokyo (JP)

(73) Assignee: Teijin Seiki Co., Ltd., Tokyo (JP)

( * ) Notice: Subject to any disclaimer, the term of this patent is extended or adjusted under 35 U.S.C. 154(b) by 246 days.

(21) Appl. No.: 10/387,068

(22) Filed: Mar. 12, 2003

(65) Prior Publication Data
US 2003/0173714 A1 Sep. 18, 2003

(30) Foreign Application Priority Data
Mar. 12, 2002 (JP) ............................ P2002-066399

(51) Int. Cl.
B28B 17/00 (2006.01)
(52) U.S. Cl. .................... 425/174.4; 264/401; 700/98; 700/118; 700/119; 700/120
(58) Field of Classification Search ............ 425/174.4; 264/401; 700/98, 118, 119, 200
See application file for complete search history.

(56) References Cited

U.S. PATENT DOCUMENTS 3,718,396 A * 2/1973 Hennings ................. 355/43
5,718,279 A * 2/1998 Satoh et al. .............. 164/456
6,461,797 B1 * 10/2002 Lercel et al. .............. 430/318

FOREIGN PATENT DOCUMENTS

| JP | 62-288844 | | 12/1987 |
|---|---|---|---|
| JP | 03-281329 | A | 12/1991 |
| JP | 04-305438 | | 10/1992 |
| JP | 04-305438 | A | 10/1992 |
| JP | 04305438 | | 10/1992 |
| JP | 05269864 | | 10/1993 |
| JP | 07-227909 | A | 8/1995 |
| JP | 07-290578 | A | 11/1995 |
| JP | 08-112863 | A | 5/1996 |
| JP | 8-281810 | | 10/1996 |
| JP | 2000309057 | A * | 11/2000 |

* cited by examiner

Primary Examiner—Robert Davis
Assistant Examiner—G. Nagesh Rao
(74) Attorney, Agent, or Firm—Akin Gump Strauss Hauer & Feld, LLP (57) ABSTRACT

A stereolithographic method which comprises irradiating the surface of a photohardenable resin composition with light through an image drawing mask capable of changing its mask image with the image drawing mask being moved in parallel to the surface of the photohardenable resin composition and the mask image of the image drawing mask being changed in synchronism with the movement of the image drawing mask according to the sectional shape pattern on the photohardened resin layer to be formed to form a photohardened resin layer having a predetermined sectional shape pattern and a stereolithographic apparatus therefor.

11 Claims, 5 Drawing Sheets

THREE-DIMENSIONAL STEREOLITHOGRAPHIC APPARATUS

The present application is based on Japanese Patent Application No. 2002-66399, the entire contents of which are incorporated herein by reference.

BACKGROUND OF THE INVENTION

1. Field of the Invention

The present invention relates to a three-dimensional stereolithographic method and apparatus using a photohardenable resin composition. More particularly, the invention relates to a three-dimensional stereolithographic method and apparatus for producing various three-dimensionally shaped products having a size ranging from small size to large size from a photohardenable resin composition with a high shaping precision and a good productivity at a high shaping rate without causing uneven curing.

2. Related Art

In recent years, a stereolithographic method and apparatus which produces a three-dimensionally shaped product by curing a photohardenable resin according to data inputted in a three-dimensional CAD has been put in practical use. This stereolithographic technique has been highlighted because it can easily produce a complicated three-dimensionally shaped product such as model for verifying the external design in the course of design, model for checking the functionality of parts, resin model for producing a mold and base model for producing a mold.

In order to produce a shaped product by a stereolithographic method, a method using a shaping bath has been generally employed. In some detail, a process has been widely employed which comprises preparing a shaping bath filled with a liquid photohardenable resin, and then repetitively effecting a step of selectively irradiating the liquid photohardenable resin with spot ultraviolet laser beam which is controlled by a computer such that a desired pattern is provided on the liquid surface of the shaping bath so that it is photohardened to a predetermined thickness to form a cured resin layer, a step of moving vertically the cured resin layer in the shaping bath so that the photohardenable resin in the shaping bath flows onto the cured resin layer to form a photohardened resin solution layer, and a step of irradiating the photohardenable resin solution layer with spot ultraviolet laser beam to form a cured resin layer until a three-dimensionally shaped product having a predetermined shape and dimension is obtained.

However, the aforementioned related art method involving the use of spot ultraviolet laser beam utilizes a so-called dot drawing process which comprises irradiating the surface of a photohardenable resin with one spot laser beam which is moving along the surface of the photohardenable resin to form a two-dimensional photohardened pattern and thus is disadvantageous in that it takes much time to shape the material, giving a lowered productivity. Further, since the ultraviolet laser device used as a light source is extremely expensive, this type of a three-dimensional stereolithographic apparatus is expensive, too.

For the purpose of eliminating the aforementioned disadvantages of the related art technique, a three-dimensional stereolithographic method using a linear exposure mask having optical shutters arranged in a row therein capable of controlling the screening of light at minute dot area has been proposed which comprises controlling the optical shutters according to a predetermined horizontal sectional shape data while scanning the exposure mask in a direction perpendicular to the orientation direction of the optical shutters to form sequentially one layer of photohardened resin layer (JP-A-4-305438). In accordance with this method, it is not necessarily required that as a light source there be used an expensive ultraviolet laser device. An inexpensive light source such as ordinary ultraviolet lamp may be used. Further, the shaping rate can be raised as compared with the aforementioned related art technique involving the use of spot ultraviolet laser beam. However, in accordance with this method, a step of forming a linear photohardened portion one row by one row in the scanning direction of the exposure mask is repeated by a plurality of times to form one layer of sectional shape pattern. When the scanning speed of the exposure mask is raised, a thoroughly photohardened portion cannot be formed one row by one row, making it necessary that the exposure mask be scanned slowly. Further, this method comprises sequentially forming a photohardened portion one row by one row to form a two-dimensional photohardened layer and thus takes much time to shape the material. Accordingly, this method cannot give a sufficiently high shaping rate and thus leaves something to be desired in productivity.

As another method there is known a method which comprises disposing an image drawing mask formed by a liquid crystal shutter capable of screening and passing light at minute dot area fixed between the light source and the surface of a photohardenable resin composition, and then repetitively effecting a step of forming a mask pattern on the image drawing mask according to one layer of sectional shape pattern to be formed with the image drawing mask suspended, a step of irradiating the surface of the photohardenable resin composition with light through the mask pattern so that the photohardenable resin composition is cured to form one layer of sectional shape pattern, a step of supplying subsequent one layer of the photohardenable resin composition onto the photohardened sectional shape pattern, a step of forming a subsequent mask pattern on the image drawing mask according to one layer of sectional shape pattern to be formed with the image drawing mask suspended, and a step of irradiating the surface of the photohardenable resin composition with light through the mask pattern so that the photohardenable resin composition is cured to form subsequent one layer of sectional shape pattern to form a three-dimensionally shaped product.

In accordance with this method, the irradiation of the surface of the photohardenable resin composition with light and the formation of one layer of photohardened sectional shape pattern are effected two-dimensionally at one time, making it possible to raise the stereolithographic building rate as compared with the aforementioned related art method involving the use of spot ultraviolet laser beam and the method disclosed in JP-A-4-305438 involving the use of a linear exposure mask having optical shutters arranged in a row therein capable of controlling the screening of light at minute dot area.

In order to produce a three-dimensionally shaped product by this method, it is necessary that the distance between adjacent minute dot areas projected on the surface of the photohardenable resin composition from the image drawing mask be not greater than 0.1 mm from the standpoint of shaping precision (resolution). It is therefore necessary that the number of pixels be at least about 2,500×2,500 dots for a shaping area size as small as 250 mm×250 mm or at least about 6,000×6,000 dots for a shaping area size as large as 600 mm×600 mm. However, there are no existing liquid crystal masks (liquid crystal shutters) or digital micro mirror shutters which satisfy the aforementioned resolution requirements. Even such a product, if any, is extremely expensive.

In accordance with this method involving the irradiation with the suspension of the fixed image drawing mask, the fineness of the exposed shape pattern is determined by the fineness (roughness) of the image drawing mask and the enlargement/reduction ratio of the pattern projected onto the surface of the photohardenable resin composition through the image drawing mask. The smaller the enlargement ratio is (the greater the reduction ratio is), the smaller is the distance between light dots on the surface of the photohardenable resin composition and the higher is the fineness of the sectional shape pattern thus formed. On the contrary, the greater the enlargement ratio is, the greater is the distance between light dots on the surface of the photohardenable resin composition and the lower is the fineness of the sectional shape pattern thus formed.

Therefore, the aforementioned method involving the fixing of the image drawing mask can difficultly produce a large-sized three-dimensionally shaped product having an excellent fineness (shaping precision) and thus can be used only to the production of a small-sized three-dimensionally shaped product from the standpoint of fineness (shaping precision).

For the purpose of eliminating the disadvantages of the aforementioned method involving the fixed image drawing mask to allow the production of a large-sized three-dimensionally shaped product using a small-sized liquid crystal shutter, JP-A-8-112863 proposes a method which comprises disposing a liquid crystal shutter (liquid crystal mask) capable of selectively passing or screening light such that they can run in parallel to the liquid level of a photohardenable resin along a plurality of divisions, and then repetitively effecting a step of moving the liquid crystal shutter to a first range in the divided running ranges, a step of irradiating the surface of the photohardenable resin composition with light through the liquid crystal shutter suspended with the light source provided in the rear of the liquid crystal shutter being moved over the range of the liquid crystal shutter to form a cured portion corresponding to the first division, a step of moving the liquid crystal shutter to a second range in the divided running ranges, a step of irradiating the surface of the photohardenable resin composition with light through the liquid crystal shutter suspended with the light source provided in the rear of the liquid crystal shutter being moved over the range of the liquid crystal shutter to form a cured portion corresponding to the second division, and a step of effecting the aforementioned steps until one layer of predetermined sectional shape pattern is formed on the surface of the photohardenable resin composition, until a predetermined three-dimensionally shaped product is formed. In this reference, the linear light source is configured to move on the liquid crystal shutter so that exposures are performed in a divided manner over the photohardenable resin composition.

Further in JP-A-07-290578, it is disclosed that the divided exposures are performed with a linear liquid crystal shutter so as to form a predetermined pattern.

However, the method disclosed in the above cited JP-A-8-112863 involves the repetition of a procedure of movement of the liquid crystal shutter to the first division in the running range, irradiation with the liquid crystal shutter suspended (formation of a photohardened portion on the surface of the photohardenable resin composition), movement of the liquid crystal shutter to the second division in the running range, irradiation with the liquid crystal shutter suspended (formation of a photohardened portion on the surface of the photohardenable resin composition), etc. causing the formation of one layer of cured sectional shape pattern and the repetition of this procedure over a plurality of layers to produce a three-dimensionally shaped product. Thus, irradiation is not effected while the liquid crystal shutter is moving to the various divisions in the running range. Therefore, in accordance with this method, exposure is not effected continuously but intermittently, lowering the shaping rate. Further, this method involves curing of the photohardenable resin composition with the liquid crystal shutter suspended in the various divisions in the running range. Thus, the photohardenable resin composition can be easily cured discontinuously or unevenly at the border of these divisions in the running range. The resulting three-dimensionally shaped product is subject to the occurrence of entire intensity spot, reduction of strength and deterioration of external appearance and dimensional precision.

As for the other references, in JP-A-7-227909, it is disclosed that a planar exposure is performed with a masking device. However, it is not disclosed to move the masking device while exposing the light and to perform exposures in divided manner over the photohardenable resin composition. Japanese Patent No. 2624239 suggests using a cathode-ray tube and a liquid crystal device as the masking device.

An aim of the invention is to provide a three-dimensional stereolithographic method and apparatus which can produce a three-dimensionally shaped product regardless of the size thereof, i.e., even if it is small-sized, middle-sized or large-sized, with a high shaping precision at a high shaping rate and a good productivity while preventing the occurrence of uneven curing.

Another aim of the invention is to provide a three-dimensional stereolithographic method and apparatus which can produce a high quality three-dimensionally shaped product having a high shaping precision and free of uneven curing smoothly at a high shaping rate even if an inexpensive light source such as ordinary ultraviolet lamp is used instead of expensive ultraviolet laser device.

SUMMARY OF THE INVENTION

The inventors made extensive studies to accomplish the aforementioned aims of the invention. As a result, it was found that when the production of a three-dimensionally shaped product involving the irradiation of the surface of a photohardenable resin composition with light through an image drawing mask to sequentially form photohardened resin layers having a predetermined sectional shape pattern is accomplished by a method which comprises irradiating the surface of the photohardened resin composition with light while moving the image drawing mask with any suspension during irradiation with light and changing the mask image (mask pattern) of the image drawing mask according to a predetermined sectional shape pattern to be formed, thereby shaping the photohardenable resin composition (irradiating the photohardenable resin composition with light while changing the mask image of the image drawing mask as in motion picture such as movie and television picture, thereby shaping the photohardenable resin composition), rather than by the aforementioned related art involving irradiation with light while fixing or suspending the image drawing mask, a three-dimensionally shaped product having a high quality can be produced regardless of the size thereof, i.e., even if it is small-sized, middle-sized or large-sized, with a high shaping precision at a higher shaping rate than in the aforementioned related art and a good productivity while preventing the occurrence of uneven curing.

The inventors also found that the employment of this method makes it possible to provide a three-dimensional stereolithographic method and apparatus which can produce a high quality three-dimensionally shaped product having a high shaping precision and free of uneven curing smoothly at a high shaping rate even if an inexpensive light source such as ordinary ultraviolet lamp is used instead of expensive ultraviolet laser device.

The inventors further found that as the image drawing mask there is preferably used an image drawing mask having a plurality of minute optical shutters disposed two-dimensionally therein capable of screening and passing light at a minute dot area, particularly an image drawing mask having liquid crystal shutters or digital micro mirror shutters disposed two-dimensionally therein, and a condensing lens capable of moving in synchronism with the image drawing mask is preferably disposed between the light source and the image drawing mask and a projection lens capable of moving in synchronism with the image drawing mask is preferably disposed between the image drawing mask and the surface of the photohardenable resin composition.

In some detail, the essence of the invention lies in:
(1) A method for preparing a three-dimensionally shaped product which comprises effecting repetitively in sequence a step of irradiating the surface of a photohardenable resin composition with light through an image drawing mask under control to form a photohardened resin layer having a predetermined sectional shape pattern, a step of applying one layer of a photohardenable resin composition to the photohardened resin layer, and a step of irradiating the surface of the photohardenable resin composition with light through an image drawing mask under control to further form a photohardened resin layer having a predetermined sectional shape pattern until a predetermined three-dimensionally shaped product is formed, wherein as the image drawing mask there is used an image drawing mask capable of changing mask image and the surface of the photohardenable resin composition is irradiated with light through the image drawing mask with the image drawing mask being moved in parallel to the surface of the photohardenable resin composition and the mask image of the image drawing mask being changed in synchronism with the movement of the image drawing mask according to the sectional shape pattern of the photohardened resin layer to be formed to form a photohardened resin layer having a predetermined sectional shape pattern.

The essence of the invention also lies in:
(2) The three-dimensional stereolithographic method according to Clause (1), wherein as the image drawing mask there is used an image drawing mask having a plurality of minute optical shutters disposed two-dimensionally therein capable of screening and passing light at a minute dot area and the surface of the photohardenable resin composition is irradiated with light with the mask image being changed by the plurality of minute optical shutters according to the sectional shape pattern to be formed during the continuous movement of the image drawing mask;
(3) The three-dimensional stereolithographic method according to Clause (2), wherein the image drawing mask is an image drawing mask having liquid crystal shutters or digital micro mirror shutters disposed two-dimensionally therein; and (4) The three-dimensional stereolithographic method according to any one of Clauses (1) to (3), wherein during the formation of one layer of photohardened resin having a predetermined sectional shape pattern the rate of continuous movement of the image drawing mask and/or the change of the mask image of the image drawing mask is adjusted such that the dose at various sites on the sectional shape pattern are the same.

The essence of the invention further lies in:
(5) A three-dimensional stereolithographic apparatus comprising:
a photohardenable resin composition supplying unit for sequentially supplying one layer of photohardenable resin composition onto a resting table or a photohardened resin layer;
a light source;
an image drawing mask capable of changing the mask image;
a moving unit for moving the image drawing mask in parallel to the surface of the photohardenable resin composition; and
a unit for changing the mask image of the image drawing mask in synchronism with the movement of the image drawing mask.

The essence of the invention further lies in:
(6) The three-dimensional stereolithographic apparatus according to Clause (5), wherein the image drawing mask is an image drawing mask having a plurality of minute optical shutters disposed two-dimensionally therein capable of screening and passing light at a minute dot area;
(7) The three-dimensional stereolithographic apparatus according to Clause (5) or (6), wherein the image drawing mask is an image drawing mask having liquid crystal shutters or digital micro mirror shutters disposed two-dimensionally therein; and
(8) The three-dimensional stereolithographic apparatus according to any one of Clauses (5) to (7), having a condensing lens capable of moving in synchronism with the image drawing mask between the light source and the image drawing mask and a projection lens capable of moving in synchronism with the image drawing mask between the image drawing mask and the surface of the photohardenable resin composition.

DETAILED DESCRIPTION OF THE PREFERRED EMBODIMENTS

The invention will be further described hereinafter.

The method of the invention comprises effecting repetitively in sequence a step of irradiating the surface of a photohardenable resin composition with light through an image drawing mask under control to form a photohardened resin layer having a predetermined sectional shape pattern, a step of applying one layer of a photohardenable resin composition to the photohardened resin layer, and a step of irradiating the surface of the photohardened resin composition with light through an image drawing mask under control to further form a photohardened resin layer having a predetermined sectional shape pattern until a predetermined three-dimensionally shaped product is formed to produce a three-dimensionally shaped product.

The aforementioned shaping process of the invention is normally accomplished by a shaping bath method which comprises repetitively effecting a step of disposing a shaping table in a shaping bath filled with a liquid photohardenable resin composition, a step of descending the shaping table to form one layer of a liquid photohardenable resin composition on the shaping table, a step of irradiating the layer of a liquid photohardenable resin composition with light through an image drawing mask under control to form a photohardened resin layer (hereinafter referred to as "photohardened layer") having a predetermined pattern and thickness, further descending the shaping table to form one layer of a liquid photohardenable resin composition on the photohardened layer surface of the shaping table, and a step of irradiating the layer of a liquid photohardenable resin composition with light through an image drawing mask under control to form an integrated lamination of photohardened layers having a predetermined pattern and thickness.

The aforementioned shaping process of the invention is accomplished by a method which comprises repetitively effecting a step of disposing a shaping table in a gas atmosphere, a step of applying one layer of a liquid, pasty, powdery or filmy photohardenable resin composition to the surface of the shaping table, a step of irradiating the layer of a photohardenable resin composition with light through an image drawing mask under control to form a photohardened layer having a predetermined pattern and thickness, a step of applying one layer of a liquid, pasty, powdery or filmy photohardenable resin composition to the surface of the shaping table, and a step of irradiating the layer of a photohardenable resin composition with light through an image drawing mask under control to form an integrated lamination of photohardenable resin composition having a predetermined pattern and thickness. In the case where this method is employed, a process maybe employed which comprises applying a photohardenable resin composition to the shaping table with the shaping table or photohardened resin layer facing upward, and then irradiating the photohardenable resin composition with light through an image drawing mask to laminate photohardenable resin layers sequentially. Alternatively, a process may be employed which comprises applying a photohardenable resin composition layer to the surface or photohardened layer of the shaping table which are positioned vertically or obliquely, and then irradiating the photohardenable resin composition layer with light through an image drawing mask to laminate photohardenable resin layers sequentially. Alternatively, a process may be employed which comprises applying a photohardenable resin composition to the surface or photohardened layer of the shaping table with the shaping able or photohardened resin layer facing downward, and then irradiating the photohardenable resin composition layer with light through an image drawing mask to laminate photohardened resin layer downward sequentially. In order to apply the photohardenable resin composition to the surface or photohardened layer of the shaping table, a proper method such as blade coating, cast coating, roller coating, transfer coating, brush coating and spray coating may be employed.

In the invention, the aforementioned shaping process is effected as follows. As the image drawing mask there is used an image drawing mask capable of changing the mask image. The surface of the photohardenable resin composition is irradiated with light through the image drawing mask with the image drawing mask being moved in parallel to the surface of the photohardenable resin composition and the mask image of the image drawing mask being changed in synchronism with the movement of the image drawing mask according to the sectional shape pattern of the photohardened resin layer to be formed to form a photohardened resin layer having a predetermined sectional shape pattern.

Here, the movement of the image drawing mask may be continuous. Also, the mask image of the image drawing mask may be continuously changed in accordance with the movement of the image drawing mask.

The aforementioned three-dimensional stereolithographic method of the invention can be smoothly carried out by the use of the three-dimensional stereolithographic apparatus of the invention which comprises:

a photohardenable resin composition supplying unit for sequentially supplying one layer of photohardenable resin composition onto a resting table or a photohardened resin layer;

a light source;

an image drawing mask capable of changing the mask image, particularly an image drawing mask having a plurality of micro optical shutters (liquid crystal shutters, digital micro mirror shutters, etc.) disposed two-dimensionally therein capable of screening and passing light at a minute dot area;

a moving unit for moving the image drawing mask in parallel to the surface of the photohardenable resin composition; and a unit for changing the mask image of the image drawing mask in synchronism with the movement of the image drawing mask.

The unit and method for moving the image drawing mask in parallel to the surface of the photohardenable resin composition are not specifically limited. With a linear guide, shaft, flat bar or the like as a guide, drive can be transmitted via ball screw, trapezoidal thread, timing belt, rack and pinion, chain or the like. As the driving source there may be used an AC servo motor, DC servo motor, stepping motor or the like. Alternatively, a linear motor system which acts both as a guide and a drive may be used. Further, the forward portion of the arm of an articulated robot may be used. Thus, the movement of this system can be accomplished by the use of an arbitrary unit and method.

The direction and velocity of continuous movement of the image drawing mask during stereolithographic building is controlled or adjusted by a computer or the like according to the kind of the light source, the intensity of light incident on the surface of the photohardenable resin composition, the surface area of the photohardenable resin composition to be exposed through the image drawing mask (exposed area), the shape of the sectional shape pattern to be formed, the kind of the photohardenable resin composition used, the photo hardening properties of the photohardenable resin composition used, the exposure time required to form a photohardened resin layer, etc. In general, by moving the image drawing mask linearly and continuously at a constant velocity from one end of the exposed area on the surface of the photohardenable resin composition to the other in parallel to the surface of the photohardenable resin composition, the dose of light incident on the surface of the photohardenable resin composition can be easily controlled uniformly.

Here, the movement of the image drawing mask may be continuous. Also, the mask image of the image drawing mask may be continuously changed. In order to continuously (animatedly) change the mask image of the image drawing mask in synchronism with the continuous movement of the image drawing mask, it is effective to store data on the mask image to be formed through the image drawing mask in a computer or the like according to the contents of the sectional shape pattern to be formed, the velocity of continuous movement of the image drawing mask, etc. and continuously change the mask image of the image drawing mask according to the date.

As the image drawing mask to be used in the invention there is preferably used an image drawing mask having a plurality of minute optical shutters disposed two-dimensionally therein capable of screening and passing light at a minute dot area. Specific examples of such an image drawing mask include liquid crystal shutter, and digital micro mirror shutter. The liquid crystal shutter and digital micro mirror shutter which are preferably used as an image drawing mask in the invention have already been used in other arts (e.g., television, personal computer, projector, car navigator, cellular telephone) as units capable of forming continuous (animated) images.

Such an image drawing mask is preferably a planar square or rectangular image drawing mask having a plurality of minute optical shutters juxtaposed two-dimensionally (in X-Y direction) therein capable of screening and passing light at a minute dot area. The number of minute optical shutters (pixels) disposed in the image drawing mask is not specifically limited but may be arbitrary as conventionally known. Examples of the liquid crystal shutter (liquid crystal display element) employable herein include QVGA (number of pixels=320 dots×240 dots), VGA (number of pixels=640 dots×480 dots), SVGA (number of pixels=800 dots×600 dots), UXGA (number of pixels=1,024 dots×768 dots), and QSXGA (number of pixels=2,560 dots×2,648 dots), which have been heretofore widely commercially available.

As the digital micro mirror shutter there may be used Digital Mirror Device (DMD: trade name) of "Digital Light Processing (DLP) Technology" (trade name), produced by Texas Instruments Incorporated, or the like.

The image drawing mask formed by the aforementioned liquid crystal shutter or digital micro mirror shutter which is preferably used in the invention uses the aforementioned plurality of minute optical shutters to screen and/or pass light according to the sectional shape pattern to be formed during the continuous movement of the image drawing mask, making it possible to continuously change the mask image as animation such as television picture and motion picture. In this manner, light corresponding to the mask image (animated mask image) which changes continuously while continuously moving is continuously incident on the surface of the photohardenable resin composition at continuously moving points so that the surface of the photohardenable resin composition thus irradiated with light is continuously cured to form one predetermined layer of sectional shape pattern.

In the case of related art technique involving irradiation of the surface of the photohardenable resin composition with light in such an arrangement that the pixel pitch (distance between adjacent pixels) on the surface of the photohardenable resin composition is predetermined to be 0.1 mm (shaping precision required for stereolithographic building) with the operation of the above exemplified liquid crystal shutter being suspended, the size of exposed area is 32 mm×24 mm for QVGA, 64 mm×48 mm for VGA, 80 mm×60 mm for SVGA, 102.4 mm×76.8 mm for UXGA or 256 mm×264.8 mm for QSXGA. Thus, the related art technique can difficultly produce three-dimensionally shaped product which is as large as greater than 300 mm as calculated in terms of size of one side of the exposed area (sectional shape pattern). On the contrary, in the case of the method of the invention, the aforementioned commercially available liquid crystal shutter or the like is used as an image drawing mask. The surface of the photohardenable resin composition is irradiated with light through the image drawing mask with the image drawing mask being continuously moved in parallel to the surface of the photohardenable resin composition and the mask image formed by the liquid crystal shutter being continuously and animatedly changed in synchronism with the movement of the liquid crystal shutter. Thus, the size of the exposed area (sectional shape pattern) is not limited, making it possible to form a photohardened sectional shape pattern having an arbitrary size. Accordingly, the method of the invention can easily produce even three-dimensionally shaped product which is as large as greater than 300 mm as calculated in terms of size of one side of the exposed area with a high shaping precision and a good productivity at a high shaping rate.

The light source is disposed in the rear of the image drawing mask. The light from the light source is incident on the surface of the photohardenable resin composition through the image drawing mask. The kind of the light source is not specifically limited. Any light source which can be used in three-dimensional stereolithographic building may be used. Examples of the light source employable herein include xenon lamp, metal halide lamp, mercury vapor lamp, fluorescent lamp, halogen lamp, incandescent lamp, Ar laser, He—Cd laser, and LD laser (semiconductor-excited solid state laser). In particular, the method of the invention can employ an inexpensive general-purpose light source such as xenon lamp, metal halide lamp, mercury vapor lamp, fluorescent lamp, halogen lamp and incandescent lamp rather than expensive light sources such as laser device which have been heretofore used in three-dimensional stereolithographic building, making it possible to render the three-dimensional stereolithographic apparatus inexpensive and easily usable.

The shape, size and number of light sources are not specifically limited and may be properly predetermined according to the shape and dimension of the image drawing mask, the shape and size of the photohardened sectional shape pattern to be formed, etc. The light source to be used herein may be spot, spherical, rod or flat. Alternatively, spot or spherical light sources may be arranged linearly in a row or a plurality of rows in the rear of the image drawing mask.

The light source may be provided in the rear of the image drawing mask in such an arrangement that it can move continuously with the image drawing mask. Alternatively, the light source may be provided fixed to a position for the purpose of enhancing the shaping precision and shaping rate, reducing the weight of the apparatus and improving the maintenance and the light from the light source may be introduced into the rear of the image drawing mask through an optical fiber, light guide or other optical transmitting units which are provided in such an arrangement that they can move continuously with the image drawing mask.

Further, for the purpose of enhancing the shaping rate, a system may be employed which comprises converging light from a plurality of light sources to enhance light energy. This system is advantageous in that light from a plurality of light sources can be easily converged particularly when an optical fiber or light guide is used.

In the invention, for the purpose of enhancing the shaping precision and shaping rate, reducing the weight of the apparatus and the apparatus cost and improving the maintenance, a unit for fairly introducing light from the light source into the image drawing mask (e.g., condensing lens, fresnel lens) or a unit for irradiating the surface of the photohardenable resin composition with light of mask image formed by the image drawing mask (optical image transmitted by the image drawing mask) on predetermined positions with a high shaping precision (e.g., projection lens, projector lens) is preferably provided according to the kind, shape and number of light sources disposed in the rear of the image drawing mask, the shape and size of the image drawing mask, etc. Such a unit is preferably arranged movable continuously in synchronism with the continuous movement of the image drawing mask.

The kind of the photohardenable resin composition to be used in the invention is not specifically limited. Any of liquid, pasty, powdery and filmy photohardenable resin compositions for use in stereolithographic building may be used.

As the photohardenable resin composition to be used in the invention there may be used a photohardenable resin composition which has heretofore been used in stereolithographic building, e.g., composition comprising one or more of various oligomers such as urethane acrylate oligomer, epoxy acrylate oligomer, ester acrylate oligomer and polyfunctional epoxy resin; various monofunctional vinyl compounds such as acrylic compound (e.g., isobornyl acrylate, isobornyl methacrylate, dicyclopentenyl acrylate, dicyclopentenyl methacrylate, dicyclopentenyloxyethyl acrylate, dicyclopentenyloxyethyl methacrylate, dicyclopetanyl acrylate, dicyclopetanyl methacrylate, bornyl acrylate, bornyl methacrylate, 2-hydroxyethyl acrylate, cyclohexyl acrylate, 2-hydroxypropyl acrylate, phenoxyethyl acrylate, morpholine acrylamide, morpholine methacrylamide, acrylamide), N-vinylpyrrolidone, N-vinylcaprolactam, vinyl acetate and styrene; polyfunctional vinyl compounds such as trimethylolpropane triacrylate, ethylene oxide-modified trimethylolpropane triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, dicyclopentanyl diacrylate, polyester diacrylate, ethylene oxide-modified bisphenol A diacrylate, pentaerythritol triacrylate, pentaerythritol tetraacrylate, propylene oxide-modified trimethylolpropane triacrylate, propylene oxide-modified bisphenol A diacrylate and tris(acryloxyethyl) isocyanurate; and various epoxy-based compounds such as hydrogenated bisphenol A diglycidyl ether, 3,4-epoxycyclohexylmethyl-3,4-epoxycyclohexane carboxylate, 2-(3,4-epoxycyclohexyl-5,5-spiro-3,4-epoxy) cyclohexane-metha-di oxane, bis(3,4-epoxycylohexylmethyl)adipate, a photopolymerization initiator, and optionally a sensitizer.

The photohardenable resin composition to be used in the invention may comprise a leveling agent, a surface active agent other than phosphoric acid ester-based surface active agent, an organic polymer modifier, an organic plasticizer, etc. incorporated therein besides the aforementioned components as necessary.

The photohardenable resin composition to be used in the invention may comprise a filler such as particulate solid material and whisker incorporated therein as necessary. The use of a photohardenable resin composition comprising a filler incorporated therein makes it possible to lessen the volume shrinkage thereof during photohardenable, there by improving the dimensional precision, mechanical properties and heat resistance of the photohardened resin composition.

Examples of the particulate solid material to be used as a filler include particulate inorganic materials such as particulate carbon black, and particulate organic polymers such as particulate polystyrene, particulate polyethylene, particulate polypropylene, particulate acrylic resin and particulate synthetic rubber. One or more of these particulate solid materials may be used. The particle diameter of the particulate solid material is not specifically limited but is preferably not greater than 200 μm, particularly not greater than 100 μm.

As the whisker to be used as a filler there is preferably used one having a diameter of from 0.3 to 1 μm, particularly from 0.3 to 0.7 μm, a length of from 10 to 70 μm, particularly from 20 to 50 μm, and an aspect ratio of from 10 to 100 μm, particularly from 20 to 70 μm. The term "dimension and aspect ratio of whisker" as used herein is meant to indicate dimension and aspect ratio measured using a laser analysis/scattering particle size distribution measuring instrument. The kind of the whisker is not specifically limited. Examples of the whisker employable herein include aluminum borate-based whisker, aluminum oxide-based whisker, aluminum nitride-based whisker, magnesium sulfate oxide-based whisker, and titanium oxide-based whisker. One or more of these whiskers may be used.

In the case where a photohardenable resin composition comprising a particulate solid material and/or whisker incorporated therein is used, the particulate solid material and the whisker are preferably incorporated in the photohardenable resin composition in an amount of from 5 to 70% by volume and from 5 to 30% by volume, respectively. In the case where both the particulate solid material and whisker are incorporated in the photohardenable resin composition, the total content of the two components is preferably from 10 to 75% by volume based on the total volume of the photohardened resin layer.

The particulate solid material and/or whisker may or may not be subjected to surface treatment with a silane coupling agent but is preferably subjected to surface treatment. The use of the particulate solid material and/or whisker subjected to surface treatment with a silane coupling agent makes it possible to obtain a photohardened product having a higher heat deformation temperature, flexural modulus and mechanical strength. As the silane coupling agent to be used herein there may be used any silane coupling agent which has heretofore been used in surface treatment of fillers. Preferred examples of the silane coupling agent employable herein include aminosilane, epoxysilane, vinylsilane, and (meth)acrylsilane.

EXAMPLES

The invention will be further described in connection with the attached drawings, but the invention is not limited to those shown in the drawings.

Figure 1:
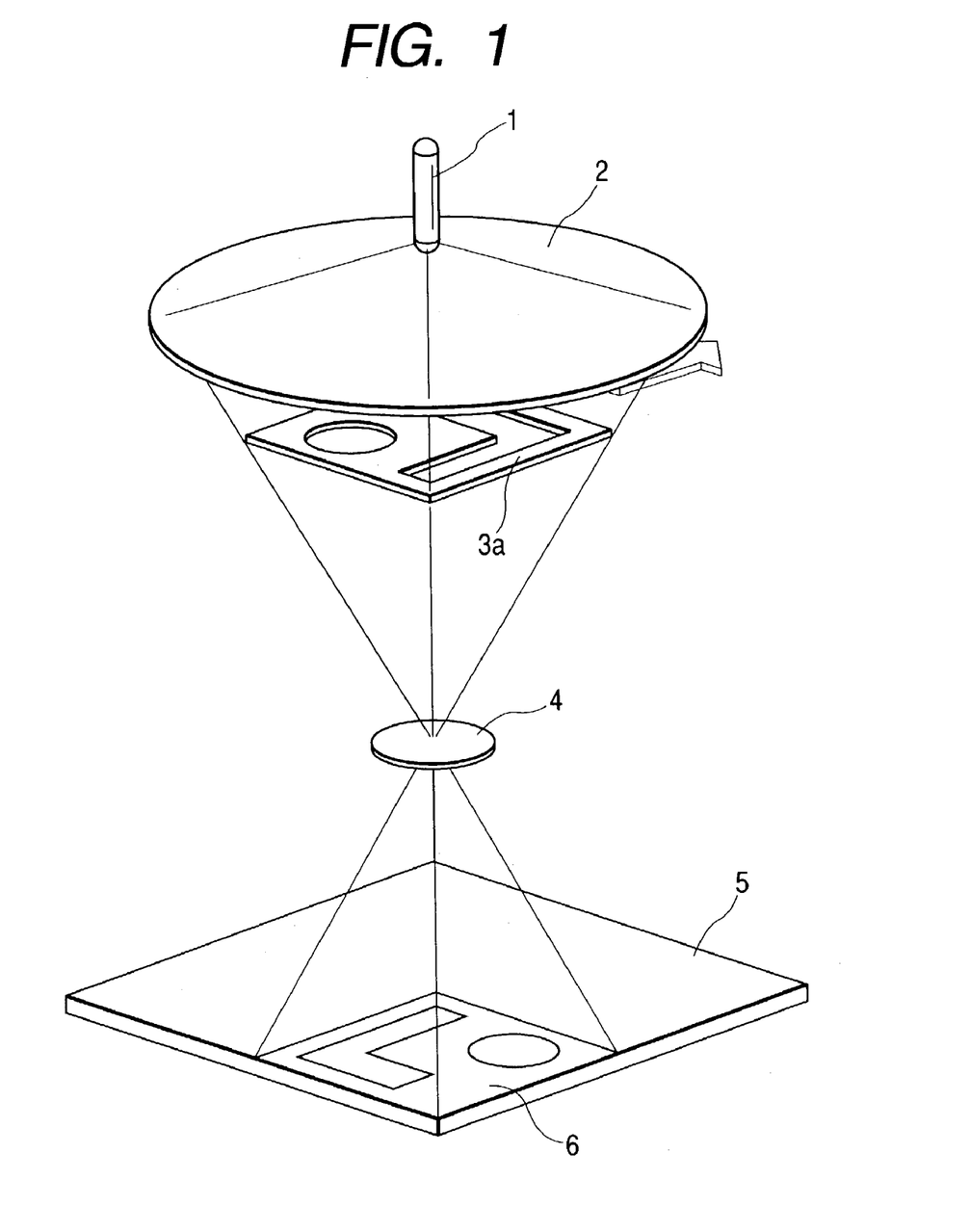
FIG. 1 is a diagram illustrating an example of the three-dimensional stereolithographic apparatus used in the invention.
Figure 2:
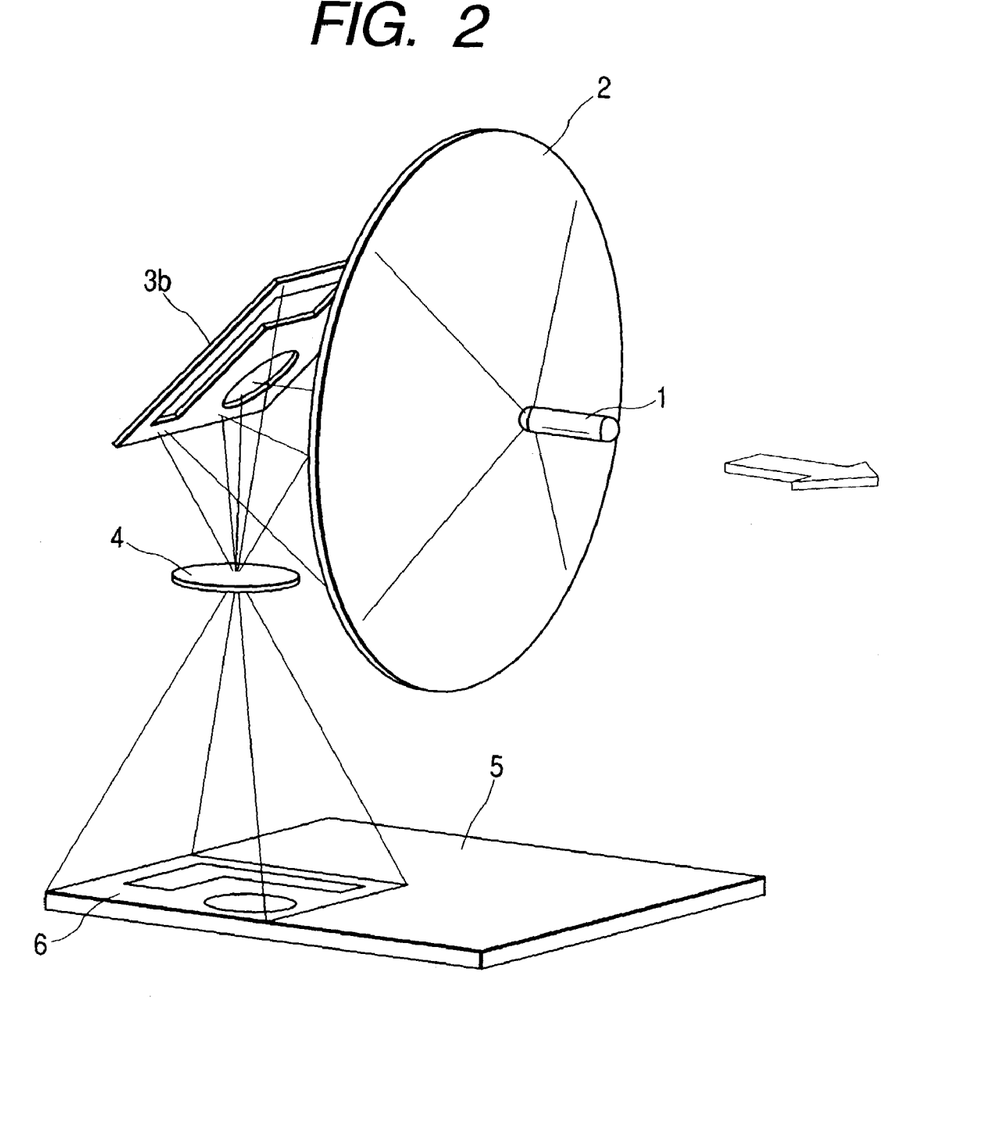
FIG. 2 is a diagram illustrating another example of the three-dimensional stereolithographic apparatus used in the invention.
Figure 3:
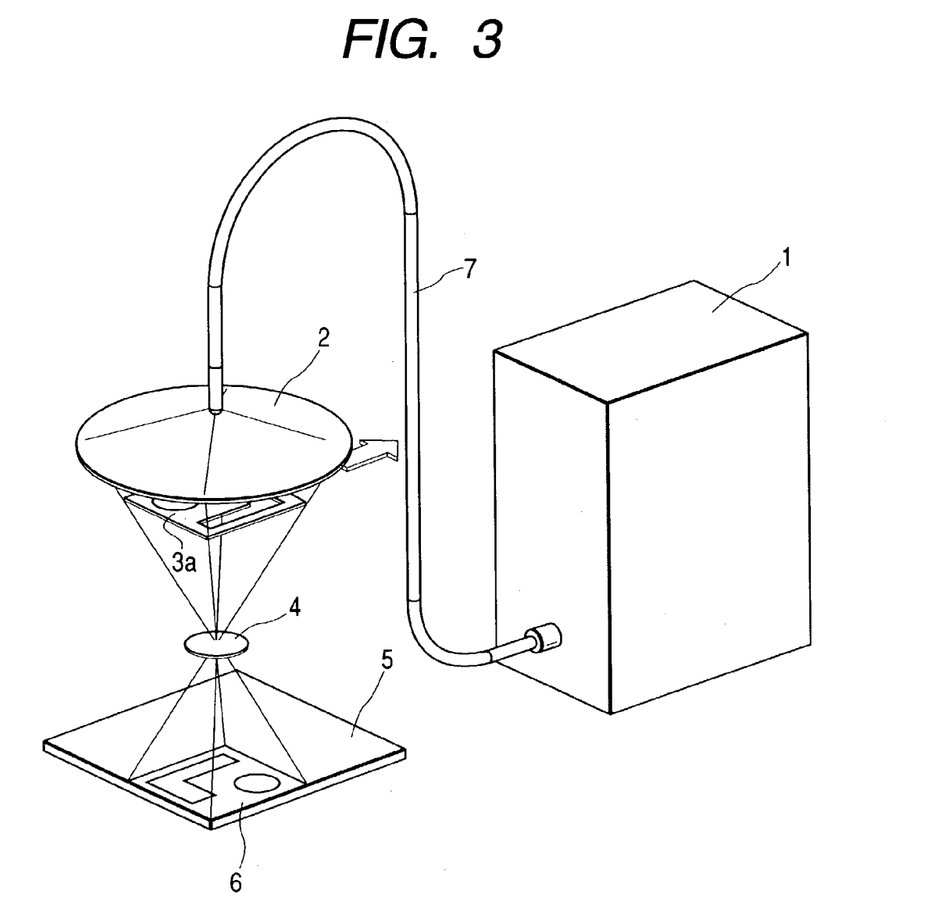
FIG. 3 is a diagram illustrating a further example of the three-dimensional stereolithographic apparatus used in the invention.
Figure 4:
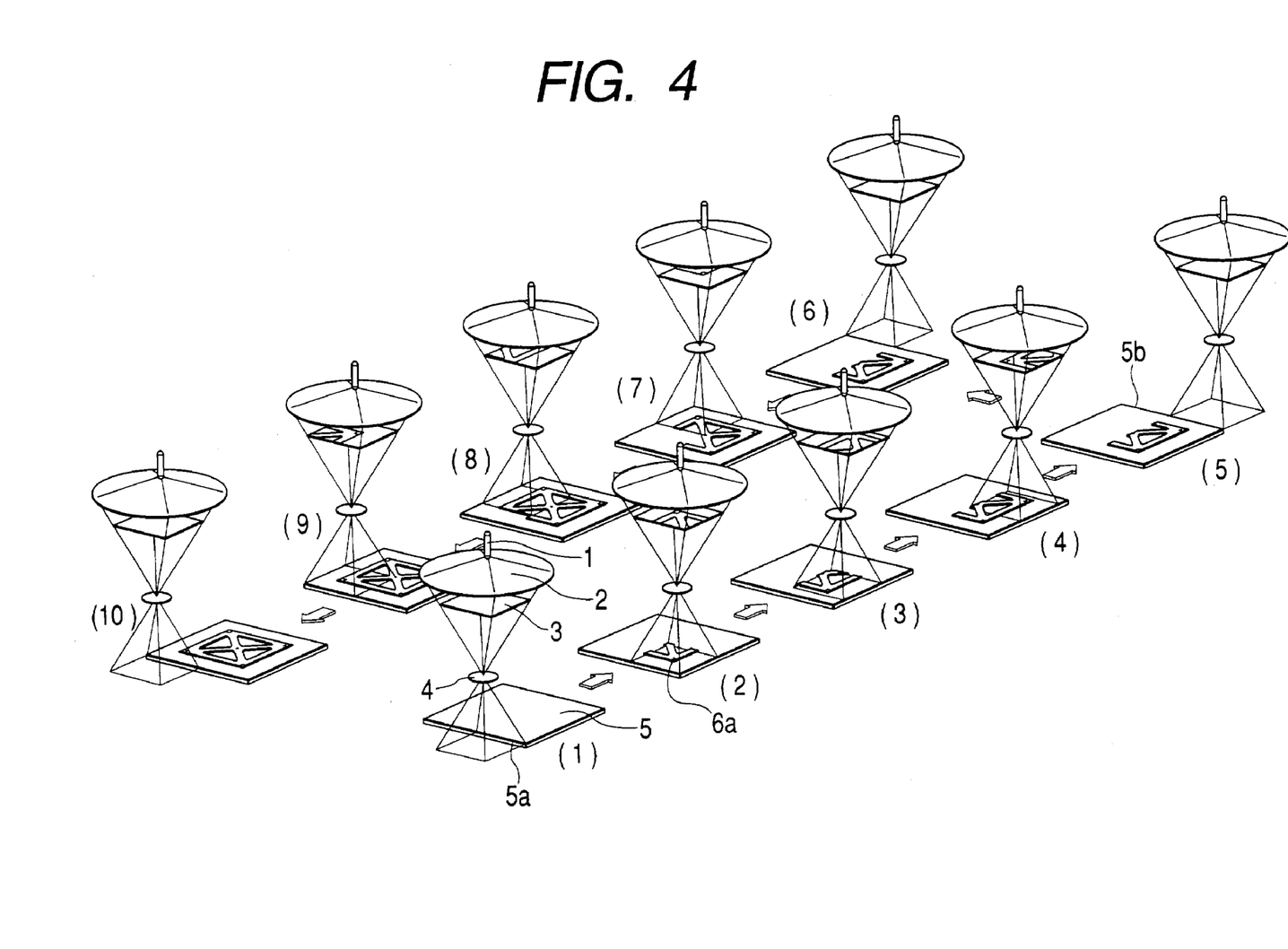
FIG. 4 is a diagram illustrating an example of the three-dimensional stereolithographic method of the invention.
Figure 5:
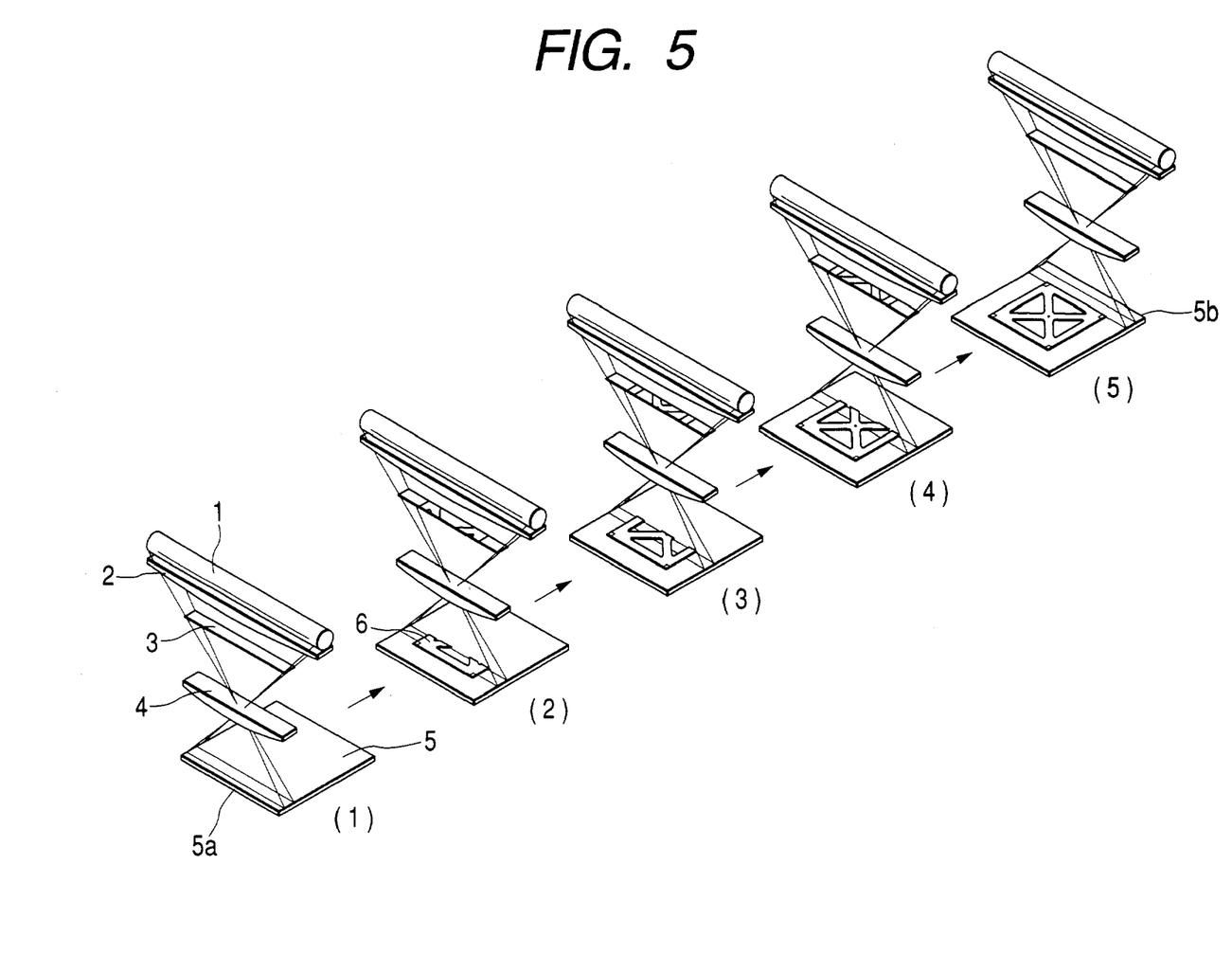
FIG. 5 is a diagram illustrating another example of the three-dimensional stereolithographic method of the invention.

FIGS. 1 to 3 illustrate a specific example of an essential part of a three-dimensional stereolithographic apparatus (stereolithographic apparatus) used in the three-dimensional stereolithographic method (stereolithographic method) of the invention. FIGS. 4 and 5 illustrate the process (operating procedure) of stereolithographic building using the stereolithographic apparatus shown in FIGS. 1 to 3 according to the method of the invention.

In FIGS. 1 to 5, the reference numeral 1 indicates a light source, the reference numeral 2 indicates a condensing lens, the reference numeral 3 indicates an image drawing mask wherein the reference numeral 3*a* indicates an image drawing mask having liquid crystal shutters disposed two-dimensionally therein (hereinafter occasionally referred to as "liquid crystal image drawing mask") and the reference numeral 3*b* indicates an image drawing mask having digital micro mirror shutters disposed two-dimensionally therein (hereinafter occasionally referred to as "DMD image drawing mask"), the reference numeral 4 indicates a projection lens, the reference numeral 5 indicates a shaping surface (one layer of shaping surface) formed by the surface of a photohardenable resin composition wherein the reference numeral 5*a* indicates one end of the shaping surface and the reference numeral 5*b* indicates the other end of the shaping surface, the reference numeral 6 indicates an exposed image (photohardened resin layer) formed on the shaping surface, and the reference numeral 7 indicates a light transmitting unit such as optical fiber and light guide.

As shown in FIGS. 1 to 5, light from the light source 1 is applied to the entire surface of the image drawing mask 3 (3*a*, 3*b*, etc.) through the condensing lens 2.

During this procedure, light from the light source 1 disposed in the rear of the condensing lens 2 may be directly introduced into the condensing lens 2 as shown in FIGS. 1 and 2. Alternatively, as shown in FIG. 3, light from the light source 1 disposed remote from the condensing lens 2 may be introduced into the condensing lens 2 through the light transmitting unit 7 such as optical fiber and light guide.

In the case of the system shown in FIGS. 1 and 2 comprising the light source 1 disposed in the rear of the condensing lens 2, the light source 1 moves continuously in the scanning direction with the condensing lens 2, the image drawing mask 3 (3*a*, 3*b*, etc.) and the projection lens 4 during stereolithographic building.

Alternatively, in the case where light from the light source 1 is introduced into the back side of the condensing lens 2 through the light transmitting unit 7 such as optical fiber and light guide as shown in FIG. 3, it may be arranged such that the flexible light transmitting unit 7 such as optical fiber and light guide moves continuously in the scanning direction with the condensing lens 2, the image drawing mask 3 (3*a*, 3*b*, etc.) and the projection lens 4 during stereolithographic building with the light source 1 being disposed fixed to a predetermined position.

The kind and shape of the light source 1 are not specifically limited. For example, the light source 1 may be a light source having a round light-emitting portion as shown in FIGS. 1 to 4 or may be a rod-shaped light source having a horizontally long (or vertically long) light-emitting portion as shown in FIG. 5. Alternatively, the light source 1 may be a light source having other shapes which are not shown.

During the stereolithographic building process, a predetermined mask image which changes continuously with the movement of the image drawing mask according to the sectional shape pattern on the photohardened resin layer to be formed is animatedly formed on the image drawing mask 3 (3*a*, 3*b*, etc.). In this arrangement, the light which has been applied to the entire surface of the image drawing mask 3 (3*a*, 3*b*, etc.) through the condensing lens 2 is passed through or screened (reflected (in the case of DMD image drawing mask)) by a predetermined mask image which changes continuously and momentarily with the image drawing mask 3 (3*a*, 3*b*, etc.). Only the light passing through the unmasked (unshielded) portion is then applied to the shaping surface 5 on the photohardenable resin composition through the projection lens 4 to form an exposed image (photohardened portion) 6 having a predetermined shape pattern on the shaping surface 5.

The shape of the image drawing mask 3 (3*a*, 3*b*, etc.) is not specifically limited and may be properly determined depending on the shape and dimension (particularly sectional shape and dimension) of the optically shaped product to be produced. The image drawing mask 3 (3*a*, 3*b*, etc.) may be square or substantially square as shown in FIGS. 1 to 4, rectangular as shown in FIG. 5 or in any other forms.

The dimension of the image drawing mask 3 (3*a*, 3*b*, etc.), too, may be properly determined depending on the shape and dimension (particularly sectional shape and dimension) of the optically shaped product to be produced. The image drawing mask 3 (3*a*, 3*b*, etc.) may have a width smaller than the total width of the predetermined photohardened sectional shape pattern to be formed (total width of shaping surface) as shown in FIGS. 1 to 4. Alternatively, as shown in FIG. 5, the image drawing mask 3 (3*a*, 3*b*, etc.) may have a width covering the total width of the predetermined photohardened sectional shape pattern to be formed (total width of shaping surface).

In the case where as the image drawing mask 3 there is used a liquid crystal image drawing mask 3*a*, the three-dimensional stereolithographic apparatus is designed such that an operation in which among the plurality of minute liquid crystal shutters disposed in the liquid crystal image drawing mask 3*a*, those positioned at sites through which light should pass open to allow the passage of light while those positioned at sites where light should be screened close to prevent the passage of light according to data stored in a computer or the like and the predetermined sectional shape to be formed in response to the continuous movement of the liquid crystal image drawing mask 3*a* is repeated continuously (animatedly) until a photohardened resin layer having a predetermined sectional shape is formed.

In the case where as the image drawing mask 3 there is used a DMD image drawing mask 3*b*, the three-dimensional stereolithographic apparatus is designed such that an operation in which among the plurality of minute mirror shutters disposed in the liquid crystal image drawing mask 3*b*, specific mirror shutters are positioned in a direction such that light is reflected (introduced into) toward the projection lens 4 and the light transmitting surface 5 while those positioned at sites where light should be screened are oriented in a direction such that light is not reflected (introduced into) toward the projection lens 4 and the light transmitting surface 5 according to data stored in a computer or the like and the predetermined sectional shape to be formed in response to the continuous movement of the DMD image drawing mask 3*b* is repeated continuously (animatedly) until a photohardened resin layer having a predetermined sectional shape is formed.

The three-dimensional stereolithographic apparatus shown in FIGS. 1 to 5 are designed such that the light source 1 or the light transmitting unit 7, the condensing lens 2, the image drawing mask 3*a* or 3*b* and the projection lens 4 move integrally and continuously with the aid of a moving unit (not shown) in parallel to the shaping surface 5 (surface of the photohardenable resin composition) during the stereolithographic building process involving the irradiation of the surface of the photohardenable resin composition with light resulting in the formation of a photohardened resin layer (They move continuously in the direction of arrow in FIGS. 1 to 5).

The shaping surface 5 (surface of the photohardenable resin composition) is irradiated with light with the mask image (mask pattern) of the image drawing mask 3 (3a, 3b, etc.) being animatedly and continuously according to data on the mask image stored in a computer or the like, e.g., according to a predetermined sectional shape pattern on the photohardened resin layer to be formed as shown in FIGS. 4 and 5, in synchronism with the continuous movement of the image drawing mask 3 (3a, 3b, etc.) as mentioned above to continuously form a photohardened resin layer having a predetermined sectional shape (exposed image 6).

FIG. 4 illustrates a continuous procedure of stereolithographic building according to the invention using an image drawing mask 3 having a width which is smaller (about half the width of the shaping surface 5 in FIG. 4) than the total width of the predetermined photohardened sectional shape pattern to be formed (exposed image 6) or the shaping surface 5.

Firstly, at the beginning of stereolithographic building, these units are positioned such that the forward end of light which has been transmitted by the image drawing mask 3 and the projection lens 4 reaches the end 5a of the shaping surface 5 as shown in FIG. 4(1). Subsequently, the light source 1 (or light transmitting unit 7), the condensing lens 2, the image drawing mask 3 and the projection lens 4 are continuously moved to the other end 5a in parallel to the shaping surface 5 as shown in FIGS. 4(2) to (5). During this procedure, the mask image formed by the image drawing mask 3 shows a continuous and animated change according to the predetermined sectional shape pattern to be formed. Light corresponding to the mask image is then applied to the shaping surface 5 to form an exposed image 6. When the aforementioned stereolithographic building process proceeds to the stage shown in FIG. 4(5), the exposed image 6 has been formed by half the width of the predetermined sectional shape pattern to be formed. At this stage, the light source 1 (or light transmitting unit 7), the condensing lens 2, the image drawing mask 3 and the projection lens 4 are moved to the position corresponding to the other half width of the shaping surface 5 where the aforementioned stereolithographic building procedure is repeated from the end 5b to the end 5a of the shaping surface 5 as shown in FIGS. 4(6) to (10). In this manner, one layer of photohardened resin layer having a predetermined sectional shape pattern to be formed (exposed image 6) is formed.

FIG. 5 illustrates a continuous procedure of stereolithographic building according to the invention using an image drawing mask 3 having a width which is the same as or substantially the same as the total width of the predetermined photohardened sectional shape pattern to be formed (exposed image 6) or the shaping surface 5.

Firstly, at the beginning of stereolithographic building, these units are positioned such that the forward end of light which has been transmitted by the image drawing mask 3 and the projection lens 4 reaches the end 5a of the shaping surface 5 where no exposed image 6 is formed on the shaping surface 5 as shown in FIG. 5(1). Subsequently, the light source 1, the condensing lens 2, the image drawing mask 3 and the projection lens 4 are continuously moved to the other end 5a on the shaping surface 5 in parallel to the shaping surface 5 as shown in FIGS. 5(2) to (5). During this procedure, the mask image formed by the image drawing mask 3 shows a continuous and animated change according to the predetermined sectional shape pattern to be formed. Light corresponding to the mask image is then applied to the shaping surface 5 to form one layer of photohardened resin layer having a predetermined sectional shape pattern to be formed (exposed image 6).

In order to effect the continuous stereolithographic building procedure shown in FIGS. 4 and 5, it is preferred that the velocity of continuous movement of the light source 1 (or light transmitting unit 7), the condensing lens 2, the image drawing mask 3 and the projection lens 4 be predetermined constant and the intensity of light which has been transmitted by the image drawing mask 3 and the projection lens 4 to reach the shaping surface 5 shows no change during stereolithographic building procedure to irradiate the shaping surface 5 with light at a constant dose at various sites on the sectional shape pattern (exposed image 6) during the formation of one layer of photohardened resin layer (exposed image 6) (continuous stereolithographic building procedure).

In accordance with the stereolithographic method of the invention involving stereolithographic building with animated and continuous change of the mask image of the image drawing mask 3 in synchronism with the continuous movement of the image drawing mask 3 according to the sectional shape pattern on the photohardened resin layer (exposed image 6) to be formed, optically shaped products having various sizes ranging from small size to large size can be easily and smoothly produced with a high shaping precision using an image drawing mask 3 smaller than the predetermined sectional shape pattern (exposed image 6) while keeping the distance between adjacent minute dot areas projected on the surface of the photohardenable resin composition from the image drawing mask 3 small as can be seen in FIGS. 4 and 5. Further, various parts (6a as shown in FIG. 4) on the exposed image 6 formed by irradiation with light (photohardened resin layer) are not cured merely by one time irradiation with light. The various parts are continuously irradiated with light until these parts (e.g., part 6a) are completely scanned with the predetermined continuously changing animated pattern of light to form a photohardened resin layer. Therefore, in accordance with the method of the invention, even when the moving velocity of light during stereolithographic building is raised, thorough photohardenable can be effected, making it possible to produce a desired optically shaped product at a high productivity in a short period of time. Further, in accordance with the method of the invention, the dose of light incident on the various parts on the exposed image 6 formed (photohardened resin having a predetermined sectional shape pattern) can be uniformalized by the aforementioned continuous irradiation. Thus, this method is not subject to occurrence of discontinuity or nonuniformity in irradiation between adjacent irradiated parts as in the aforementioned related art technique involving irradiation with light with the image drawing mask 3 fixed. Accordingly, uniform spot-free irradiation with light can be effected all over the sectional shape pattern, making it possible to provide an optically shaped product free of intensity spot having an enhanced dimensional precision and shaping precision and a better external appearance.

Moreover, in accordance with the method of the invention, the projected picture can be reduced to effect stereolithographic building, thereby raising the drawing resolution. Further, the reduction of the projected picture can exert an effect of raising the light intensity per unit area on the drawing portion and hence reducing the time required for irradiation on the irradiated area. Supposing that there is an image having a size of 250 mm×250 mm and an intensity of 1 mW/cm² formed by one time irradiation of a photohardenable resin composition having a curing sensitivity of 5 mJ, the time required for irradiation is 5 seconds. When an exposed layer having the same area size as the aforementioned size 250 mm×250 mm is finally formed from the quarter size (125 mm×125 mm) of this image (irradiated area) by the method of the invention (method which comprises effecting photohardenable with continuous movement of the image drawing mask and animated and continuous change of the mask image in synchronism with the movement of the image drawing mask), the resulting drawing resolution is four times that given by one time irradiation with the image drawing mask suspended (fixed). The intensity of light per unit area is four times (4 mW/cm²) that given by one time irradiation. The time required to expose the area of 250 mm×250 mm continuously with the movement of the image drawing mask is the same as that required for one time irradiation (5 seconds). In other words, the execution of the method of the invention using a reduced optical system makes it possible to drastically enhance the shaping precision while keeping the shaping time equal to that required for one time irradiation with the image drawing mask suspended.

Example 1

Using a stereolithographic apparatus shown in FIG. 4 comprising a 150 W metal halide lamp as a light source 1 and a Type system VGA liquid crystal (800×640 pixels) produced by SEIKO EPSON CORPORATION as an image drawing mask 3, a Type ADEKARASCURE HSX-V2 photohardenable resin composition (having a curing sensitivity of 5 mJ) produced by ASAHI DENKA KOGYO K. K. was irradiated with light in such a manner that the projected size on the shaping surface 5 (surface of the photohardenable resin composition) is 35 mm (direction of movement of apparatus)×47 mm (direction perpendicular to the moving direction) (rectangular) and the light energy intensity on the shaping surface 5 is 1 mW/cm² while the light source 1, the condensing lens 2, the image drawing mask 3 and the projection lens 4 were being integrally moved continuously in parallel to the shaping surface 5 at a velocity of about 7 mm/sec in the forward direction according to the method shown in FIG. 4 with the mask image of the image drawing mask 3 formed by a liquid crystal being continuously changed according to the sectional shape pattern to be formed. As a result, a three-dimensionally shaped product (90 mm long×80 mm wide×15 mm thick) having a sectional shape pattern shown in FIG. 4 was produced. In this stereolithographic building process, the irradiation time at various parts on the photohardened layer was 5 seconds, and the dose of light incident on the various parts was 5 mJ. In this manner, an optically shaped product free of uneven curing having an excellent dimensional precision and an excellent external appearance and strength was smoothly produced at a high shaping rate.

Moreover, in the embodiment, the light source and the image drawing mask is moved by the moving unit. However, the invention can be embodied in a state that the light source and the image drawing mask are fixed at a predetermined position, and the photohardenable resin composition is moved so that the light source and the mask are moved relatively to the photohardenable resin composition. In this case, the mask image of the image drawing mask may be changed in accordance with the movement of the photohardenable resin composition.

Of cause, both of the photohardenable resin composition and the set of the light source and the drawing mask may be configured to be mobile.

As for the apparatus of the invention, the resin composition may be moved by connecting a moving unit to a table or the like on which the photohardenable resin composition is disposed.

By moving the photohardenable resin composition, the same advantages of the invention can be obtained.

It should be noted that the light is not necessarily uniform over irradiating scope. However, as a result of moving the irradiating scope continuously with a uniform rate, a dose of the planar light at various sites on the predetermined sectional shape pattern becomes substantially the same.

Specifically, in the above embodiment, the movement of the image drawing mask is continuous. Also, the mask image of the image drawing mask is continuously changed. However, the invention is not limited by this feature. The movement of the image drawing mask may be intermittent so as to stop at predetermined positions. In accordance with the movement of the image drawing mask, the mask image may be changed intermittently.

Further, although the condensing lens and the projection lens are provided in each of the foregoing embodiments, the invention can be embodied without providing the condensing lens and the projection lens.

The image drawing mask of the invention is not limited to those having a planar shape. The mask may be formed in a curved shape for instant. Further, the light irradiated on the photohardenable resin composition is not limited to the planar light as long as the light constitutes an image data.

As can be seen in the aforementioned description, in accordance with the method of the invention, a high quality three-dimensionally shaped product having an excellent dimensional precision, strength and external appearance can be produced regardless of the size thereof, i.e., even if it is small-sized, middle-sized or large-sized, with a high shaping precision at a higher shaping rate and a better productivity than in the related art technique while preventing the occurrence of uneven curing.

Further, in accordance with the method of the invention, a high quality three-dimensionally shaped product free of uneven curing having a high shaping precision can be smoothly at a high shaping rate even if an inexpensive light source such as ordinary ultraviolet lamp is used instead of expensive ultraviolet laser device.

What is claimed is:

1. A three-dimensional stereolithographic apparatus comprising:
    a photohardenable resin composition supplying unit for sequentially supplying one layer of photohardenable resin composition;
    a light source providing a light;
    a moving unit for moving an image drawing mask substantially parallel to a major surface of the photohardenable resin composition layer;
    the image drawing mask being capable of changing the mask image according to the movement of the image drawing mask and;
    a unit for changing the mask image of the image drawing mask in synchronism with the movement of a projected area of the light across the surface of the photohardenable resin composition layer.

2. The three-dimensional stereolithographic apparatus according to claim 1, wherein the image drawing mask is provided with a plurality of minute optical shutters disposed two-dimensionally therein and capable of screening and passing light at a minute dot area.

3. The three-dimensional stereolithographic apparatus according to claim 1, wherein the image drawing mask is provided with liquid crystal shutters or digital micro mirror shutters disposed two-dimensionally therein.

4. The three-dimensional stereolithographic apparatus according to claim 2, wherein the image drawing mask is provided with liquid crystal shutters or digital micro mirror shutters disposed two-dimensionally therein.

5. The three-dimensional stereolithographic apparatus according to claim 1, further comprising a condensing lens provided between the light source and the image drawing mask and a projection lens provided between the image drawing mask and the surface of the photohardenable resin composition, wherein the condensing lens and the projection lens are capable of moving in synchronism with the image drawing mask.

6. The three-dimensional stereolithographic apparatus according to claim 2, further comprising a condensing lens provided between the light source and the image drawing mask and a projection lens provided between the image drawing mask and the surface of the photohardenable resin composition, wherein the condensing lens and the projection lens are capable of moving in synchronism with the image drawing mask.

7. The three-dimensional stereolithographic apparatus according to claim 3, further comprising a condensing lens provided between the light source and the image drawing mask and a projection lens provided between the image drawing mask and the surface of the photohardenable resin composition, wherein the condensing lens and the projection lens are capable of moving in synchronism with the image drawing mask.

8. The three-dimensional stereolithographic apparatus according to claim 4, further comprising a condensing lens provided between the light source and the image drawing mask and a projection lens provided between the image drawing mask and the surface of the photohardenable resin composition, wherein the condensing lens and the projection lens are capable of moving in synchronism with the image drawing mask.

9. The three-dimensional stereolithographic apparatus according to claim 1, wherein a movement of the image drawing mask is continuous and the mask image of the image drawing mask is continuously changed.

10. The three-dimensional stereolithographic apparatus according to claim 4, wherein a movement of the image drawing mask is continuous and the mask image of the image drawing mask is continuously changed.

11. A three-dimensional stereolithographic apparatus comprising:

a photoharden able resin composition supplying unit for sequentially supplying one layer of photohardenable resin composition;

a light source providing a light;

an image drawing mask capable of continuously changing the mask image;

a moving Limit for continuously moving the image drawing mask substantially in parallel with a surface of the photohardenable resin composition; and a unit for changing the mask image of the image drawing mask in synchronism with the movement of the image drawing mask.

* * * * *